United States Patent Office 3,087,831
Patented Apr. 30, 1963

3,087,831
LIGHT REFLECTING FILMS AND PROCESS FOR THEIR PRODUCTION
Charles M. Browne, Toledo, Ohio, assignor to Libbey-Owens-Ford Glass Company, Toledo, Ohio, a corporation of Ohio
No Drawing. Filed Apr. 17, 1959, Ser. No. 806,992
15 Claims. (Cl. 117—35)

This invention relates broadly to high reflecting thin films and to a process for the production thereof.

More particularly this invention relates to high reflecting thin films and to their production on oxidation resisting surfaces by a two stage process wherein a powdery layer of metal particles and a metal oxide film are caused to unite to form a film having characteristics different from either of the original materials from which it is formed.

Further, this invention relates to high reflecting thin films which are produced by the union of a powdery layer of metal oxide particles and a metal oxide film.

A simplified flow diagram of the method is as follows:

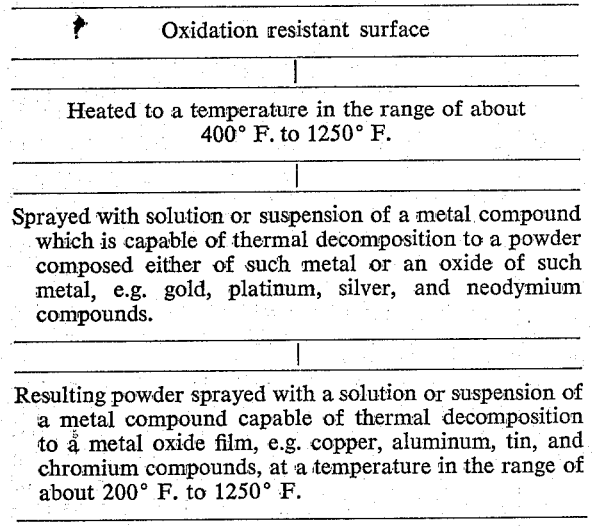

Heretofore the production of films of gold, platinum and the like surfaces such as glass has required that the film be applied by the processes of vacuum or chemical deposition. The reason is that when, for example, a liquid containing a metal compound such as gold chloride is sprayed upon a suitable heated surface, a powdery layer of loosely adherent agglomerated particles of gold is formed instead of a film. This layer has substantially no utility.

According to the vacuum deposition technique metallic gold and a surface to be filmed therewith are positioned in a vacuum chamber under extremely low pressure and the gold is vaporized and caused to be deposited as a film upon the surface. As is well known however, vacuum deposition is a relatively expensive procedure and is not as adapted to high volume production as is a spraying technique. In the vacuum deposition operation it is necessary, after positioning the film producing material and the surface to be coated in a vacuum chamber, to reduce the pressure within the chamber to substantially zero. This operation entails the use of suitable pumps and is time-consuming because once the pumps are started a considerable interval of time is required before the desired reduced pressure is reached. Meanwhile the pumps are consuming electrical or other energy required to operate them.

Chemical deposition, like vacuum deposition, is also a comparatively expensive process requiring a number of time consuming and consequently expensive manipulations.

In contrast, a filming operation by the spray technique is very fast and extremely well adapted to high volume production where large square footages are encountered.

It is accordingly an important object of the present invention to provide a novel spray process for producing high reflecting and colored thin films.

It is another important object to provide novel high reflecting and colored thin films.

A further object is to provide a spray process for producing high reflecting thin films wherein a powdery layer of a metal or metal oxide is formed in a first step and a film-forming metal oxide is united with the powdery layer in a sceond step.

Another object is to provide high reflecting thin films containing particles of gold, platinum, silver or the like, in combination with a film-forming metal oxide.

Still another object is to provide high reflecting thin films containing particles of metal oxide in combination with a film-forming metal oxide.

In accordance with the present invention a suitable surface such as glass is provided and such surface is heated. Then a spray of a solution or suspension of a metal compound, which is capable of thermal decomposition to a powder of metal or metal oxide, is sprayed upon the heated surface. Immediately thereafter a solution or suspension of a compound of a metal, which is capable of thermal decomposition to a metal oxide film, is sprayed over the metal or metal oxide powder. The result is a film having properties different from either of the components.

Metals which can be used in accordance with the present invention to form deposits of metal particles upon the heated surface in the initial step of the operation include gold, platinum and silver. With respect to gold, it may be utilized in the form of gold chloride. Platinum is similarly employed as the chloride. However, silver must be used in the form of silver ammonium complex because silver chloride does not undergo decomposition at spraying temperatures to form a powder.

In addition to compounds of metals which form metal powders on thermal decomposition, compounds of metals which form metal oxide powders also may be employed. Neodymium chloride is one material in this category.

Gold chloride, platinum chloride and silver ammonium complex can be applied in most any liquid in which they are soluble. Gold chloride, for example, can be dissolved and applied in alcohols such as methyl, ethyl and isopropyl. It is also soluble in water, acetic acid, ether and acetone. The alcohols are usually preferred because of economic considerations. Platinum chloride is also suitably applied while dissolved in alcohol or water. The silver ammonium complex and neodymium chloride are also applied while dissolved in alcohol or water.

The concentration of a solution of powder-forming compound is not critical. However, from a practical standpoint and for ease of controlling the amount of metal or metal oxide powder applied, a concentration in the range from 1% to 20% by weight is employed. Preferably a concentration in the range from about 5% to 15% is employed.

Metals whose compounds form films of metallic oxides upon thermal decomposition may be used in practicing the second step of the present invention. Thus films of copper oxide, cadmium oxide, zinc oxide, aluminum oxide, indium oxide, lead oxide, silicon oxide, tin oxide, titanium oxide, antimony oxide, arsenic oxide, bismuth oxide, vanadium oxide, chromium oxide, molybdenum oxide, tungsten oxide, manganese oxide, cobalt oxide, iron oxide and nickel oxide may be employed. These films are produced by spraying a solution of the metal compound upon the heated surface having metal particles or metal oxide powder of the type mentioned above loosely adhered thereto to cause the oxide film formation.

Copper and cadmium are used in the form of the nitrates. Copper also may be used as the copper ammonium complexes.

Zinc and cobalt are used as acetates.

Aluminum, indium, lead, silicon, tin, titanium, antimony, arsenic, bismuth and iron are employed as the chlorides. Lead may also be used in the forms of the acetate and as tetraethyl lead. In the case of tin the tetrachloride may be used. Also many organic compounds of tin form films upon thermal decomposition and are included within the scope of the invention. One organo tin compound is dibutyl tin diacetate. Titanium is employed as the tetrachloride. Titanium may also be used in the form of organic titanates. In the case of antimony the tri or penta chlorides may be used. Iron is employed as either ferrous or ferric chloride.

Vanadium is employed in the form of vanadyl sulfate ($VSO_4$).

Chromium, molybdenum, tungsten, manganese, and nickel are used as the 2-ethyl hexanoate.

With the exception of the 2-ethyl hexanoate compounds, these materials are generally soluble in alcohols and water and may be applied when dissolved therein. Titanium tetrachloride may be dissolved in benzene in addition to alcohol. Antimony chloride requires dry alcohol. Antimony chloride is also applicable in benzene, toluene and carbon tetrachloride. The 2-ethyl hexanoate compounds are dissolved in cyclohexane, n-hexane or the equivalent for use.

A film formation in accordance with the present invention is effected by spraying the metal or metal oxide powder-forming constituent upon a surface heated to a temperature in the range from about 400° F. to about 1250° F. The oxide film can be applied in a range from 200° F. to 1250° F., depending upon the material used.

The advantages of this invention are illustrated in the following examples. The ingredients and their proportions are presented as being typical and should not be construed to limit the invention unduly.

*Example I*

A 2 x 2 inch sheet of polished plate glass ¼ inch in thickness was heated for 5 minutes in a furnace at 1250° F. and sprayed with 10 cc. of 10% alcoholic gold chloride. This produced a powdery film of gold metal loosely adhered to the glass. The powdery deposit was immediately sprayed with 20 cc. of 20% alcoholic indium chloride.

Upon application of the second spray a physical change in the appearance of the gold deposit occurred. The gold powder had a slight pinkish color, low reflectivity, and was very loosely adhered to the glass. An indium oxide film is transparent with a moderate reflectivity in the visible spectral range. However, the combination film does not have the characteristics of either of the individual film components. The new film takes on a dichroic character being vivid blue by transmitted light and being highly reflecting in the red.

*Example II*

A 2 x 2 inch sheet of polished plate glass, ¼ inch in thickness, was heated for 5 minutes in a furnace at 1250° F. and sprayed with 10 cc. of 10% alcoholic platinum chloride. This produced a powdery film of platinum metal loosely adhered to the glass. The powdery deposit was immediately sprayed with 20 cc. of 20% alcoholic indium chloride.

A high reflecting film of lavender color was produced.

*Example III*

A 2 x 2 inch sheet of polished plate glass, ¼ inch in thickness, was heated for 5 minutes in a furnace at 1250° F. and sprayed with 10 cc. of 10% alcoholic silver ammonium complex. This produced a powdery film of silver metal loosely adhered to the glass. The powdery deposit was immediately sprayed with 20 cc. of 20% alcoholic indium chloride.

A high reflecting film of yellow color was produced.

*Example IV*

A 2 x 2 inch sheet of polished plate glass, ¼ inch in thickness, was heated for 5 minutes in a furnace at 1250° F. and sprayed with 10 cc. of 10% alcoholic neodymium chloride. This produced a powdery layer of neodymium oxide loosely adhered to the glass. The powdery deposit was immediately sprayed with 20 cc. of 20% alcoholic titanium chloride.

A high reflecting film of pink color was produced.

While the exact mechanism by which films are produced in accordance with the present invention is not known, there are two possible explanations. First, the metal, or metal oxide powder, may be dissolved into the oxide film which is subsequently applied. The second possible explanation is that the metal, or metal oxide powder, has reacted chemically with the metal oxide film subsequently applied, or formed a colloidal dispersion of metal in the oxide layer.

In the case of powders of metal oxides, their ability to react with a film-former and to form successful films seems to be related to the activity of the oxide as initially formed. For example, neodymium oxide powder will react with a titanium oxide film if the two are brought together soon after the formation of the neodymium oxide powder. If the neodymium oxide powder is allowed to cool off and then reheated, little or no reaction occurs when a titanium oxide film is subsequently applied thereto.

Films made in accordance with the present invention are particularly important for reflecting in the near infra red (close to visible).

An important point to be emphasized with respect to the present invention is that entirely different results are obtained when a solution containing two metals or compounds thereof is applied to a surface, as contrasted to the application of a first layer of powdery metal, or metal oxide, followed by a metal oxide film in accordance with the concept of the present invention.

It is to be considered within the scope of the invention to apply these novel films to any base material adapted to be heated to the temperatures described above. Thus glass, quartz and broadly siliceous surfaces may be filmed by this technique.

Additionally, films produced in accordance with the present invention may be deposited upon metal surfaces such as stainless steel, platinum, gold and others which will withstand the heating range described above without deterioration as by oxidation or melting.

It is to be understood that the form of the invention herewith described is to be taken as an illustrative embodiment only of the same, and that various procedural changes may be resorted to without departing from the spirit of the invention or the scope of the subjoined claims.

I claim:

1. A process for producing a reflecting film including the steps of, providing an oxidation resistant surface, heating said surface, spraying upon said heated surface a liquid containing a metal compound which is capable of thermal decomposition to particles of the metal, or metal oxide, in loosely adhering relation upon said surface, and immediately spraying over the particulate metal so formed a compound of a metal which is capable of thermal decomposition to a film of metal oxide.

2. A process for producing a reflecting film including the steps of providing an oxidation resistant surface, heating said surface to a temperature in the range from about 400° F. to about 1250° F., spraying upon said heated surface an alcoholic solution of a material selected from the group consisting of gold chloride, platinum chloride, silver ammonium complex and neodymium chloride to form a thin layer of metal or metal oxide particles loosely adhering to the surface, then spraying over said metal or metal oxide particles a liquid containing a compound of a metal which is capable of thermal decomposition to a film of metal oxide.

3. An oxidation resisting surface and a reflecting film on said surface, said film formed by the process of claim 2.

4. A process for producing a reflecting film including the steps of providing an oxidation resistant surface, heating said surface to a temperature in the range from about 400° F. to about 1250° F., spraying upon said heated surface an alcoholic solution of a material selected from the group consisting of gold chloride, platinum chloride, silver ammonium complex and neodymium chloride to form a thin layer of metal or metal oxide particles loosely adhering to the surface, then spraying over said metal or metal oxide particles a liquid containing a material selected from the group consisting of copper nitrate, cadmium nitrate, zinc acetate, aluminum chloride, indium chloride, lead chloride, lead acetate, tetraethyl lead, silicon chloride, tin chloride, dibutyl tin diacetate, titanium chloride, antimony chloride, arsenic chloride, bismuth chloride, vanadyl sulfate, chromium 2-ethyl hexanoate, molybdenum 2-ethyl hexanoate, tungsten 2-ethyl hexanoate, manganese 2-ethyl hexanoate, cobalt acetate, iron chloride, and nickel 2-ethyl hexanoate.

5. An oxidation resisting surface and a reflecting film on said surface, said film formed by the process of claim 4.

6. A process for producing a high reflecting film including the steps of providing a glass surface, heating said surface to a temperature in the range from about 400° F. to about 1250° F., spraying alcoholic gold chloride upon said heated surface to form a powdery deposit of a metallic gold loosely adhered upon said surface, and spraying alcoholic indium chloride upon said gold deposit.

7. A glass sheet and a high reflecting film on a surface of said sheet, said film formed by the process of claim 6.

8. A process for producing a reflecting film including the steps of providing a glass surface, heating said surface to a temperature in the range from about 400° F. to about 1250° F., spraying alcoholic platinum chloride upon said heated surface to form a powdery deposit of metallic platinum loosely adhered upon said surface, and spraying alcoholic indium chloride upon said platinum deposit.

9. A glass sheet and a reflecting film on a surface of said sheet, said film formed by the process of claim 8.

10. A process for producing a reflecting film including the steps of providing a glass surface, heating said surface to a temperature in the range from about 400° F. to about 1250° F., spraying alcoholic silver ammonium complex upon said heated surface to form a powdery deposit of metallic silver loosely adhered upon said surface, and spraying alcoholic indium chloride upon said silver deposit.

11. A glass sheet and a reflecting film on a surface of said sheet, said film formed by the process of claim 10.

12. A process for producing a reflecting film including the steps of providing a glass surface, heating said surface to a temperature in the range from about 400° F. to about 1250° F., spraying alcoholic neodymium chloride upon said heated surface to form a powdery deposit of neodymium oxide loosely adhered upon said surface, and spraying alcoholic titanium chloride upon said neodymium oxide deposit.

13. A glass sheet and a reflecting film on a surface of said sheet, said film formed by the process of claim 12.

14. An oxidation resisting surface and a film on said surface, said film comprising a reaction product of a metal powder formed in situ on said surface by the thermal decomposition of a first metal compound at a temperature in the range of about 400° F. to 1250° F., with a metal oxide formed by the thermal decomposition of a second metal compound upon contact thereof with said powder at a temperature in the range of about 1200° F. to 1250° F.

15. An oxidation resisting surface and a film on said surface, said film comprising a reaction product of a metal oxide powder formed in situ on said surface by the thermal decomposition of a first metal compound at a temperature in the range of about 400° F. to 1250° F., with a metal oxide formed by the thermal decomposition of a second metal compound upon contact thereof with said powder at a temperature in the range of about 200° F. to 1250° F.

References Cited in the file of this patent

UNITED STATES PATENTS

| | | |
|---|---|---|
| 1,884,665 | Greiner | Oct. 25, 1932 |
| 2,333,534 | Lang | Nov. 2, 1943 |
| 2,592,601 | Raymond et al. | Apr. 15, 1952 |
| 2,617,741 | Lytle | Nov. 11, 1952 |
| 2,757,104 | Howes | July 31, 1956 |
| 2,770,558 | Gaiser | Nov. 13, 1956 |
| 2,955,958 | Brown | Oct. 11, 1960 |